United States Patent [19]

Nagasawa et al.

[11] Patent Number: 4,956,724

[45] Date of Patent: Sep. 11, 1990

[54] MULTI-CHANNEL RECORDING AND/OR REPRODUCING APPARATUS CAPABLE OF SIMULTANEOUSLY RECORDING AND/OR REPRODUCING OF TWO CHANNELS

[75] Inventors: Kenichi Nagasawa; Toshiyuki Masui, both of Kanagawa, Japan

[73] Assignee: Canon Kabushiki Kaisha, Tokyo, Japan

[21] Appl. No.: 256,104

[22] Filed: Oct. 7, 1988

Related U.S. Application Data

[63] Continuation of Ser. No. 813,669, Dec. 26, 1985, abandoned.

[30] Foreign Application Priority Data

Dec. 26, 1984 [JP] Japan ................... 59-276931

[51] Int. Cl.$^5$ ............................................. G11B 5/09
[52] U.S. Cl. ............................................. 360/8; 360/32
[58] Field of Search ................... 360/8, 22, 32, 64, 77, 360/77.02

[56] References Cited

U.S. PATENT DOCUMENTS

| | | | |
|---|---|---|---|
| 4,234,896 | 11/1980 | Onishi et al. | 360/32 |
| 4,303,950 | 1/1981 | Taniguchi et al. | 360/10.3 |
| 4,489,354 | 12/1984 | Dann | 360/22 |
| 4,542,419 | 9/1985 | Morio et al. | 360/32 |
| 4,549,227 | 10/1985 | Hashimoto et al. | 360/32 |
| 4,622,598 | 11/1986 | Doi et al. | 360/22 |
| 4,816,926 | 3/1989 | Moriwaki et al. | 360/32 |

Primary Examiner—Vincent P. Canney
Attorney, Agent, or Firm—Toren, McGeady & Associates

[57] ABSTRACT

An information signal recording and/or reproducing apparatus, of the kind for recording or reproducing information signals on or from a tape-shaped record bearing medium which has a plurality of areas extending in parallel with each other in the longitudinal direction of the medium, is arranged to record or reproduce a first information signal with a first rotary head which traces the medium in such a way as to traverse each of the plurality of areas while rotating through an angle of $\theta$ degrees, and to record or reproduce a second information signal with a second rotary head which traces the medium by rotating at a phase differing by of $n\theta$ degrees, wherein "n" is an integer other than 0, from the rotation phase of the first rotary head.

23 Claims, 8 Drawing Sheets

MULTI-CHANNEL RECORDING AND/OR REPRODUCING APPARATUS CAPABLE OF SIMULTANEOUSLY RECORDING AND/OR REPRODUCING OF TWO CHANNELS

This is a continuation of application Ser. No. 813,669, filed Dec. 26, 1985, abandoned.

BACKGROUND OF THE INVENTION

1. Field of the Invention

This invention is broadly concerned with an information signal recording and/or reproducing apparatus, and, more particularly, with an apparatus arranged to record or reproduce information signals on or from a tape-shaped record bearing medium having a plurality of areas extending in parallel with each other in the longitudinal direction of the medium.

2. Description of the Prior Art

High density recording has recently become a subject of pursuit in the field of magnetic recording. Video tape recorders (hereinafter referred to as VTR's) also have become capable of performing magnetic recording to a higher degree of density with the travelling speed of the tape lowered. Therefore, the conventional arrangement of using a fixed head for audio signal recording does not give a sufficiently high relative speed and thus results in the degradation of reproduced sound quality. In one of the solutions of this problem, the recording tracks formed by a rotary head are lengthened to have audio signals which are compressed on the time base recorded in the lengthened portion of the recording tracks one after another.

In the case of a VTR of the two-rotary-head helical scanning type, for example, a magnetic recording tape has been arranged to be wrapped at least 180 degrees around a rotary cylinder. Then, a VTR of this type has been contrived, according to the above-stated solution, wherein the magnetic recording tape is wrapped at least $(180+\theta)$ degrees around the rotary cylinder; and time-base compressed audio signals, which are pulse code modulated, are recorded in the additional portion of $\theta$ degree. FIG. 1 of the accompanying drawings schematically shows the tape transport system of the above-stated VTR. FIG. 2 shows recording tracks formed on a magnetic tape by the VTR of FIG. 1. The illustration includes a magnetic tape 1; a rotary cylinder 2; heads 3 and 4 which are mounted with a phase difference of 180 degrees on the cylinder 2 and have different azimuth angles from each other; video signal recording areas 5 formed on the tape 1; and audio signal recording areas 6 formed also on the tape 1. Each of the video areas 5 is formed within the 180 degree, wrapped portion of the tape 1 on the rotary cylinder 2 traced by the heads 3 and 4. Each of the audio areas 6 is formed with the angle $\theta$ degree portion of the tape wrapped on the cylinder 2 traced by the heads 3 and 4. In FIG. 2, reference symbols f1 to f4 represent the frequency values of tracking pilot signals superimposed on the recording tracks in accordance with a known four frequency method. The frequency values of these pilot signals are in the following relation: $f2-f1=f3-f4\approx fH$ and $f4-f2\approx 2fH$, wherein fH represents the horizontal scanning frequency of the video signal.

With the audio signal, which is compressed on the time-base and is pulse code modulated (hereinafter referred to as PCM processed), recorded in the audio areas, the audio signal can be reproduced with a high sound quality, which is comparable with the quality attainable by an audio apparatus which is adapted specially for recording and reproduction of an analog signal.

Meanwhile, there has been proposed a method of recording additional audio signals also in the video areas 5 of the VTR of the above-stated type. This method is as follows: Assuming that the angle $\theta$ is arranged to be $\theta=36$, five additional audio areas are obtainable with the rotary head rotated 180 degrees. Then, an arrangement to have time-base compressed audio signals recorded independently in these areas, enables audio signals to be recorded in six channels. Thus, an audio dedicated or appropriated video tape recorder can be arranged to be capable of recording audio signals in six channels. The following briefly describes this tape recorder:

FIG. 3 shows the tape transport system of the above-stated tape recorder. FIG. 4 shows recording tracks formed on a tape by this tape recorder. The same reference numerals and symbols are used as in FIGS. 1 and 2. When the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein, respectively. An operation called azimuth-overwrite is performed on these areas. However, the tracks of these areas CH1 - CH6 do not have to be on the same straight line. Each of the areas CH1 - CH6 has one pilot signal recorded therein for tracking control. Different pilot signals are thus recorded in different areas in the order of rotation f1→f2→f3→f4. However, there is no correlation between them.

Referring further to FIG. 3, recording or reproduction is carried out in or from the areas CH1 to CH3 while the tape 1 is travelling at a predetermined speed in the direction of arrow 7, and in or from the areas CH4 to CH6 while the tape is travelling in the direction of arrow 9. Therefore, as shown in FIG. 4, the inclination of the areas CH1 to CH3 somewhat differs from that of the areas CH4 to CH6. With regard to a difference in the relative speed of the tape and the head for these groups of areas, a difference arising from the travel of the tape 1 is extremely small as compared with a difference arising from the rotation of the heads 3 and 4. Therefore, the difference in the relative speed presents no problem.

FIGS. 5(a) to 5(j) show, in a time chart, the recording or reproducing operation of the tape recorder which is arranged as described above. A phase detection pulse (hereinafter referred to as a PG signal), which is generated in synchronism with the rotation of the cylinder 2, is as shown at FIG. 5(a). The PG signal is a rectangular wave of 30 Hz repeating a high level (hereinafter referred to as an H level) and a low level (hereinafter referred to as an L level) alternately with each other at intervals of 1/60 sec. Another PG signal, which is of the opposite polarity to the PG signal of FIG. 5(a), is shown in FIG. 5(b). The first PG signal is at an H level while the head 3 is rotating from the point B to the point G of FIG. 3. The other PG signal shown in FIG. 5(b) is at an H level while the other head 4 is rotating from the point B to the point G.

Pulses for reading data are obtained from the PG signal of FIG. 5(a) as shown in FIG. 5(c). The data reading pulses are used for sampling the audio signal at a period corresponding to one field (1/60 sec). FIG. 5(d) shows, by H level parts thereof, periods provided for signal processing on the one field portion of the sampled audio data by adding an error correcting redundant code or by changing the arrangement thereof by means of a RAM or the like. FIG. 5(e) shows a signal indicating data recording periods at H level parts thereof which represent timing for recording, on the tape 1, the recording data obtained through the signal processing operation mentioned above.

Referring to FIGS. 5(a) to 5(j), the temporal flow of signals are, for example, as follows: The data sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time t6, or while the head 3 is moving from the point A to the point B. In other words, the data is recorded by the head 3 in the area CH1 as shown in FIG. 4. Meanwhile, the data which is sampled while the PG signal of FIG. 5(b) is at an H level is also processed at a similar timing before it is recorded in the area CH1 by the head 4.

FIG. 5(f) shows another PG signal which is obtained by shifting the phase of the PG signal of FIG. 5(a) to a predetermined degree, which corresponds to one area and is 36 degrees in this specific instance.

An audio signal recording operation using the PG signal of FIG. 5(f) and a PG signal which is not shown but is of an opposite polarity to the former is performed in the following manner: The data which is sampled during a period between the points of time t2 and t4 is subjected to a signal processing operation during a period between the points of time t4 and t6 in accordance with the signal of FIG. 5(g) and is recorded during a period between the points of time t6 and t7 in accordance with the signal of FIG. 5(h). In other words, the data is recorded in the area CH2 of FIG. 4 while the head is moving from the point B to the point C. Meanwhile, another data which is sampled during the points of time t4 and t7 is likewise recorded in the area CH2 by means of the other head during a period between the points of time t4 and t7.

The signal which is recorded in the area CH2 in the manner as described above, is reproduced in the following manner:

The head 3 reads the data from the tape 1 in accordance with a signal shown in FIG. 5(h) during the period between the points of time t6 and t7 (and also during the period between the points of time t1 and t2). Then, during the period between the points of time t7 and t8 (and also between t2 and t3), the reproduced signal is subjected to a signal processing operation, which is carried out in a manner reverse to the signal processing operation performed for recording, in accordance with a signal shown in FIG. 5(i). In other words, error correction and other processes are carried out during this period. Then, during a period between points of time t8 and t9, the reproduced audio signal which has been thus processed is produced in accordance with a signal shown in FIG. 5(j). The reproducing operation of the head 4 is, of course, performed with a phase difference of 180 degrees from the above-stated reproduction by the head 3, so that a continuous reproduced audio signal can be obtained.

For other areas CH3 to CH6, it goes without saying that the recording and reproducing operation are performed on the basis of the PG signal of FIG. 5(a) by phase shifting it by n×36 degrees. This is independent of the travelling direction of the tape.

In the case of the apparatus of this kind, it is extremely difficult to record or reproduce an audio signal with a high degree of fidelity and also to broaden the bandwidth of the audio signal. It is another shortcoming of the conventional apparatuses that they allow only a limited degree of latitude excluding such functions called "after-recording", "sound-on-sound recording", etc.

SUMMARY OF THE INVENTION

It is therefore a general object of the present invention to provide an information signal recording and/or reproducing apparatus which is capable of eliminating the above-stated shortcomings of the, prior art apparatuses.

More specifically stated, it is an object of this invention to provide an information signal recording and/or reproducing apparatus arranged to permit recording and/or reproduction in varied manners as desired by utilizing two or more of a plurality of areas of a tape-shaped record bearing medium which extend in parallel with each other in the longitudinal direction of the medium.

Under this object, an information signal recording and/or reproducing apparatus, arranged, according to this invention as an embodiment thereof, to record or reproduce information signals on or from a tape-shaped record bearing medium having a plurality of areas extending in parallel with each other in the longitudinal direction of the medium, comprises: a first rotary head which records or reproduces a first information signal by tracing the medium in such a way as to traverse each of the plurality of areas rotating a degree of angle $\theta$; and a second rotary head which records or reproduces a second information signal by rotating at a phase differing from the rotation phase of the first rotary head by an angle of $n\theta$, wherein "n" is an integer other than 0.

It is another object of this invention to provide an information recording and/or reproducing apparatus which is capable of increasing the amount of information that can be recorded or reproduced at a time.

Under that object, an information signal recording and/or reproducing apparatus, arranged according to this invention as an embodiment thereof, comprises: first recording and/or reproducing means arranged to record and/or reproduce a first information signal on or from a first area among a plurality of areas extending in parallel with each other in the longitudinal direction of a tape-shaped record bearing medium, the first recording and/or reproducing means including at least one rotary head; and second recording and/or reproducing means arranged to record and/or reproduce a second information signal on or from a second area among the plurality of areas simultaneously with the recording or reproducing operation of the first recording and/or reproducing means, the second recording and/or reproducing means including at least one rotary head.

It is a further object of this invention to provide an information signal recording and/or reproducing apparatus which is capable of switching the degree of density of information recording from one degree of density over to another.

Under the above-stated object, an information signal recording apparatus, arranged according to this invention as another embodiment thereof, comprises: signal generating means arranged to generate first and second signals relative to one and the same information signal; first recording means for recording the first signal in a first area longitudinally extending on a tape-shaped record bearing medium; second recording means for recording, simultaneously with the first signal, the second signal on a second area extending on the record bearing medium in parallel with the first area; and switching means for switch-over between a first recording mode, in which the information signal is recorded solely by the first recording means, and a second recording mode, in which the information signal is recorded by both the first and second recording means.

These and further objects and features of this invention will become apparent from the following detailed description of an embodiment thereof taken in connection with the accompanying drawings.

DETAILED DESCRIPTION OF THE PREFERRED EMBODIMENTS

This invention is directed to an apparatus for recording or reproducing information signals simultaneously using two or more of the areas CH1 to CH6 mentioned in the foregoing. If a one-field portion of a two-channel stereo audio signal, digitized at a sampling frequency fs and a number of quantized bits l is arranged to be recordable within one area, an information signal can be recorded in quantity twice as much as the quantity recordable in the case of using two areas. In view of this, an apparatus according to this invention performs recording in the following manner:

Audio signals of two channels are recorded in one area while audio signals of two channels are recorded in another area for recording or reproducing audio signals of four channels. Then, they are rearranged into two dot interleaved data sequences by arranging the sampling frequency to be 2fs. Each of the two data sequence is recorded in one area. This arrangement then permits recording or reproduction at an apparently doubled sampling frequency. In other words, it permits recording or reproduction of an information signal having a doubled bandwidth. Further, the number of quantized bits is arranged to be 2l. A data corresponding to the upper l bits is recorded in one of the areas and a data corresponding to the lower l bits in the other area. With the number of quantizing bits increased in this manner, recording and reproduction can be accomplished with a high degree of fidelity.

Further, in case where a sound-on-sound function is desired for the purpose of so-called after-recording, the sound-on-sound function is obtainable by arranging the apparatus to permit simultaneous reproduction from two areas or to perform recording in one area and to perform reproduction from the other area.

For the simultaneous use of two areas in the manner as mentioned above, however, the conventional apparatus mentioned in the foregoing necessitates a signal processing operation on the information signal in a time sharing manner. This requires a longer period of time to impose a great limitation on the possible modes of signal processing. Besides, the arrangement of a timing signal generating system, which is necessary for recording or reproduction, becomes complex.

Figure 5:
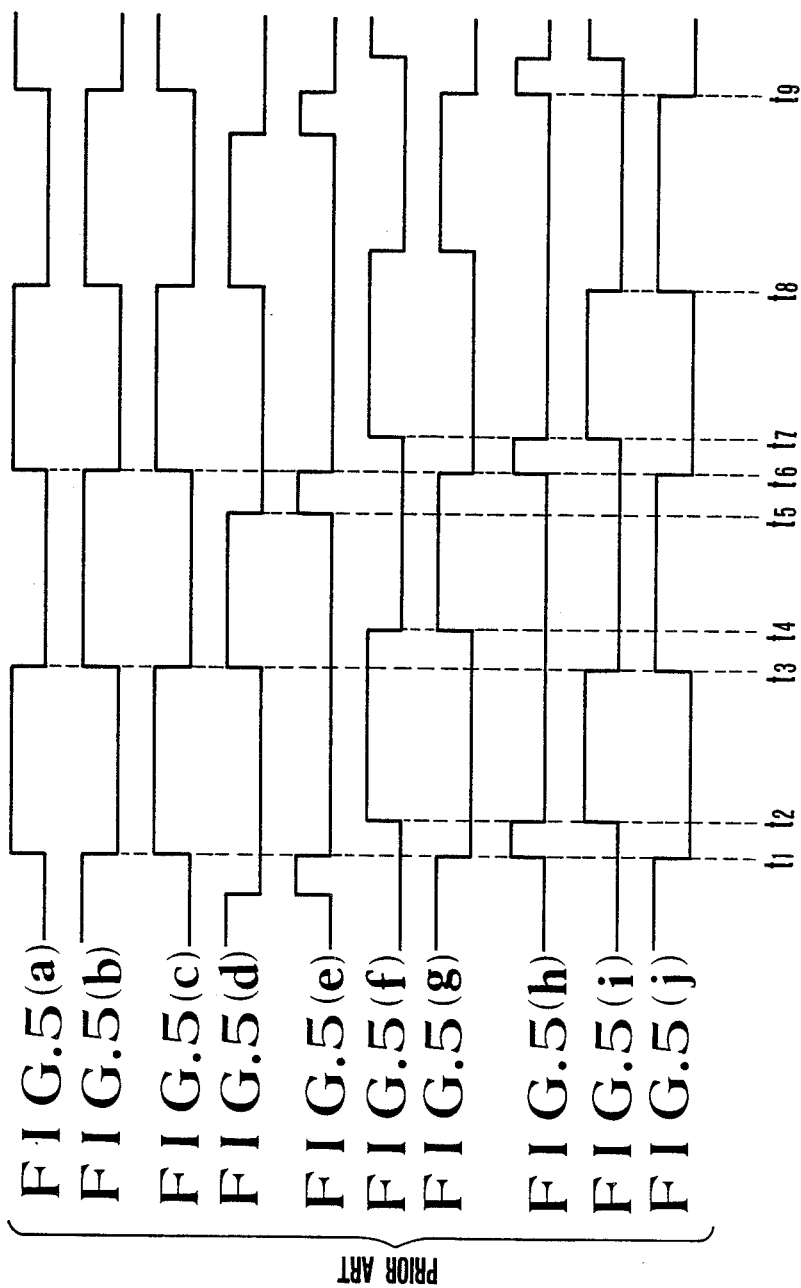
FIGS. 5(a) to 5(j) show, in a time chart, the recording and reproducing operations of the tape recorder shown in FIG. 3.

For example, in case where recording is to be performed by simultaneously using the areas CH1 and CH2, the conventional apparatus presents the following problem: Recording is performed onto the area CH1 during a period between a points of time t5 and t6 and onto the area CH2 during a period between the points of time t6 and t7 as shown in FIG. 5. Therefore, even with the sampling period assumed to be between the points of time t2 and t4, signal processing must be accomplished within a period between the points of time t4 and t5. Therefore, in this instance, signal processing cannot be performed in the same manner as the conventional signal processing operation. The conventional arrangement thus presents a problem even in terms of interchangeability with another unit of the conventional apparatus. Further, in case that two areas which are not adjacent to each other, are to be used, the period of time available for signal processing further decreases.

Figure 1:
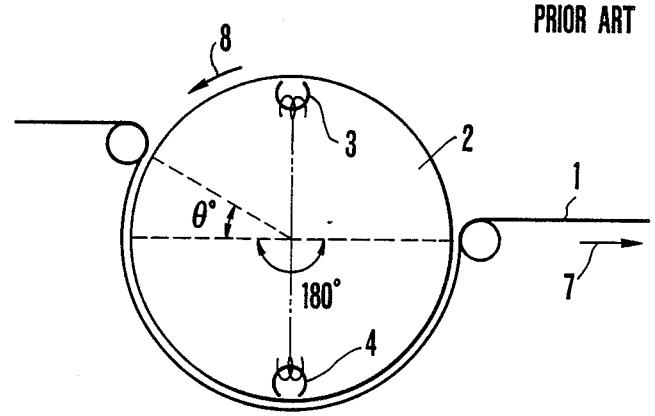
FIG. 1 schematically shows the tape moving system of the conventional VTR.
Figure 2:
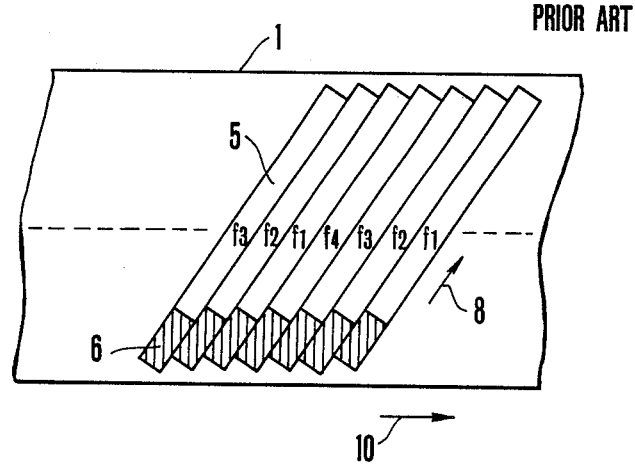
FIG. 2 schematically shows recording tracks formed on a magnetic recording tape by the VTR shown in FIG. 1.
Figure 3:
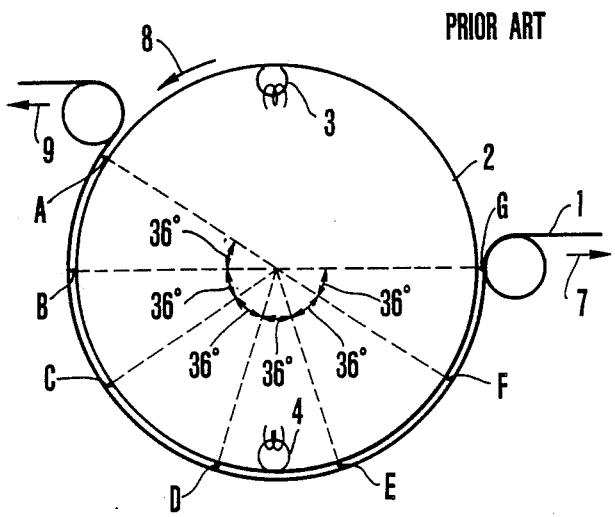
FIG. 3 schematically shows the tape moving system of the conventional tape recorder.
Figure 4:
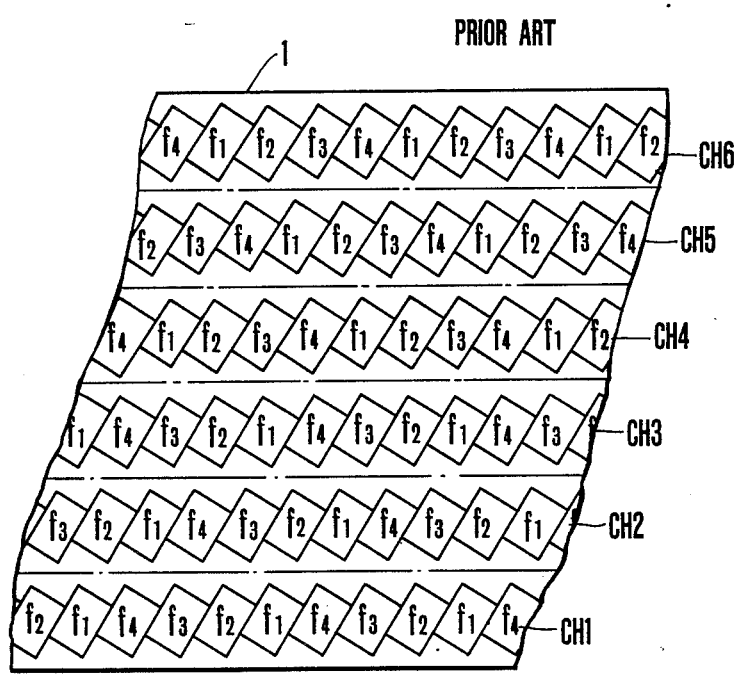
FIG. 4 schematically shows recording tracks formed on a tape by the tape recorder shown in FIG. 3.
Figure 6:
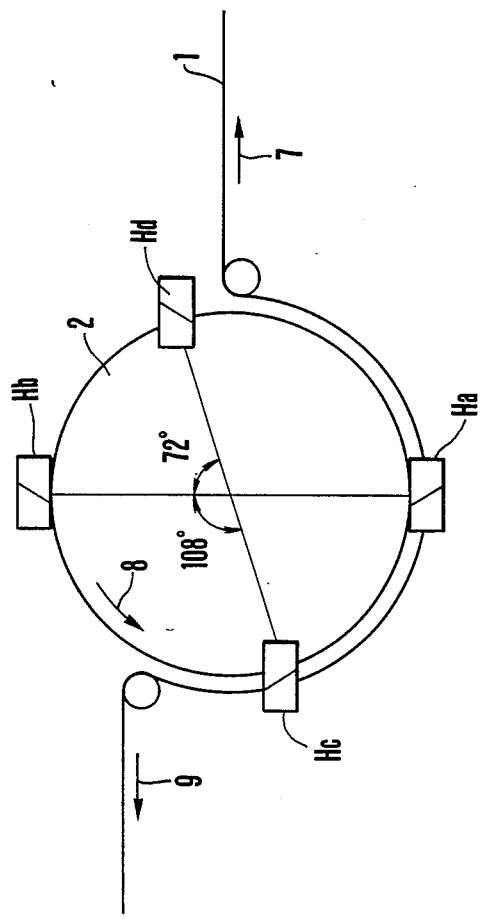
FIG. 6 schematically shows the head arrangement of a tape recorder embodying this invention as an embodiment thereof.
Figure 7:
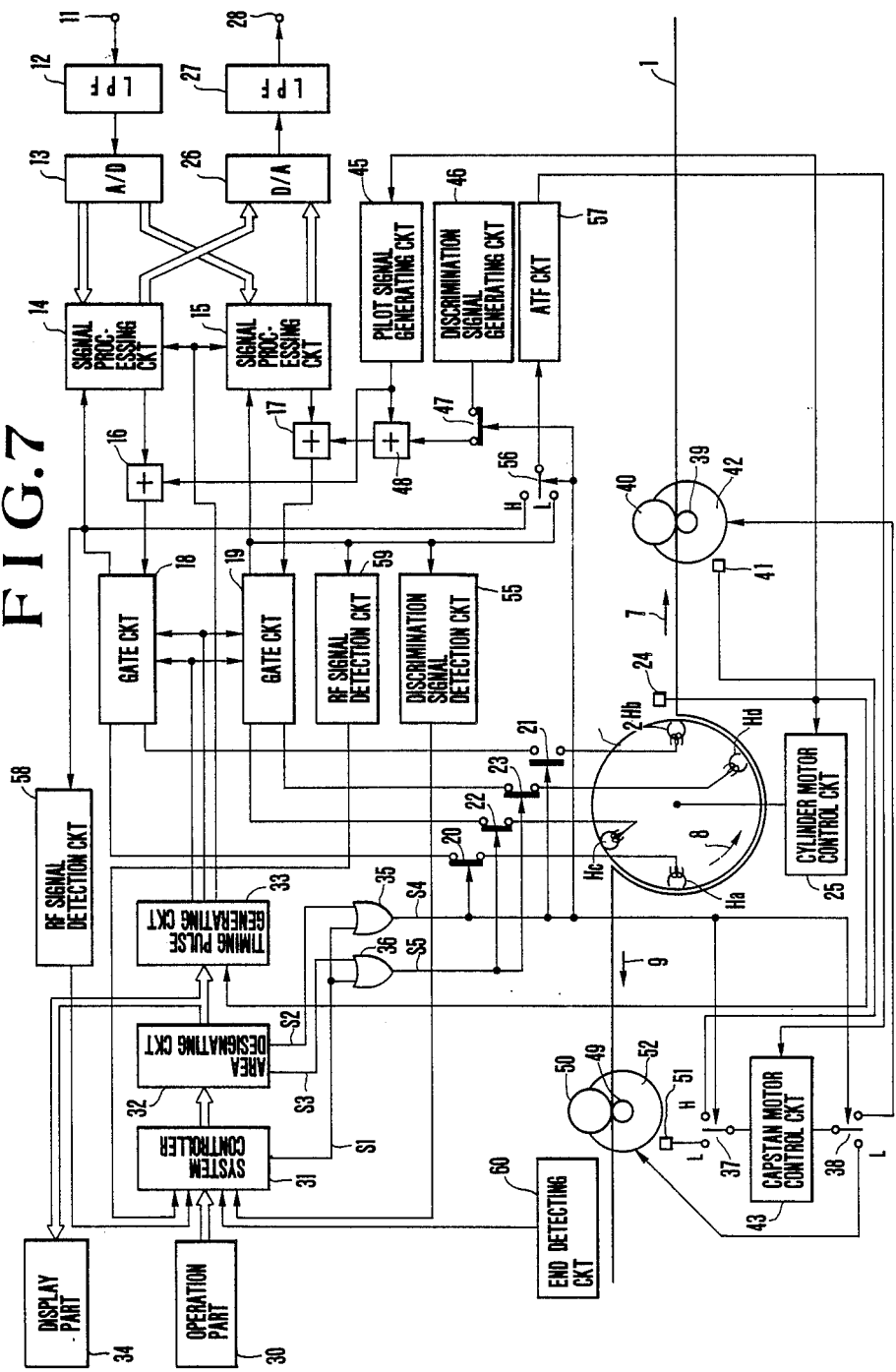
FIG. 7 is a block diagram showing, in outline, the arrangement of the tape recorder shown in FIG. 6.

The embodiment of this invention, which is described below, is arranged to eliminate all of these problems of the conventional apparatus:

FIG. 6 schematically shows the head arrangement of a tape recorder embodying this invention as an embodiment of this invention. FIG. 7 shows in a block diagram the outline of an arrangement of this embodiment. In FIG. 6, the component elements similar to those shown in FIG. 3 are indicated by the same reference numerals. Heads Ha and Hb are arranged to record an information signal in the areas CH1, CH2 and CH3. These heads Ha and Hb have different azimuth angles and are arranged to have rotation phases differing 180 degrees from each other. Heads Hc and Hd are arranged to record an information signal in the areas CH4, CH5 and CH6. The heads Hc and Hd have different azimuth angles from each other and also have rotation phases differing 180 degrees from each other.

The phases of the heads Hc and Hd are advanced 108 degrees from those of the heads Ha and Hb. Therefore, while the heads Ha and Hb are tracing the area CH1, the heads Hc and Hd are tracing the area CH4 at exactly the same timing. Likewise, while the heads Ha and Hb are tracing the area CH2 or CH3, the heads Hc and Hd are also tracing the area CH5 or CH6 at exactly the same timing. The tape recorder, arranged according to this invention as shown in FIG. 7, performs a recording or reproducing operation as follows:

The same reference numerals are used in both FIGS. 6 and 7. FIGS. 8(a) to 8(g) and 9(a) to 9(f) show in timing charts, the operations of the various parts shown in FIG. 7.

An analog audio signal is applied to a terminal 11. The analog signal is then supplied to an analog-to-digital (A/D) converter 13 via a low-pass filter 12 (hereinafter referred to as LPF) which has a cut-off frequency of 2fH (fH being the horizontal scanning frequency of a video signal).

Figure 9:
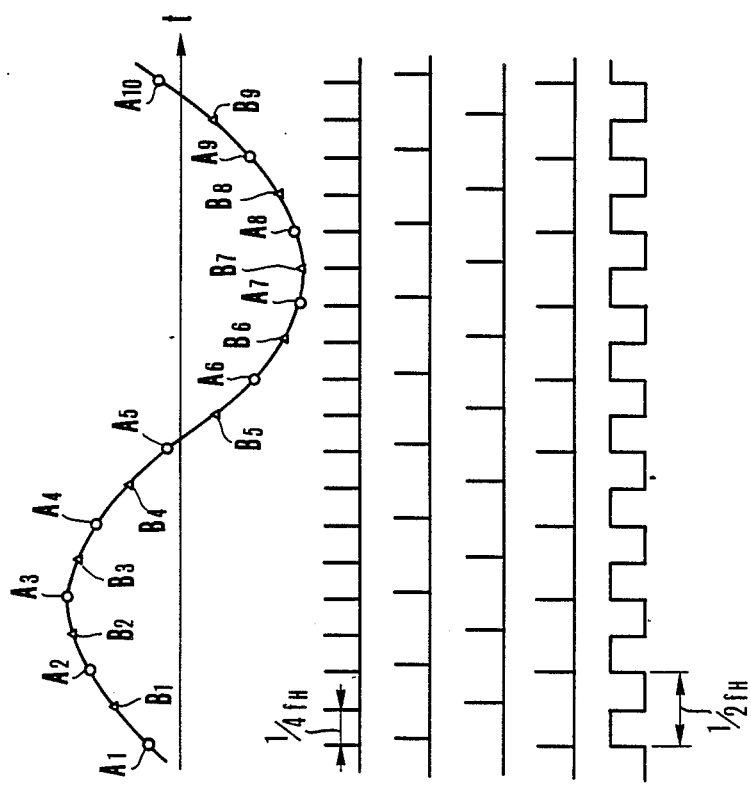
FIGS. 9(a) to 9(f) show, in a time chart, the operations of D/A and A/D conversion circuits included in the tape recorder shown in FIG. 7.

Referring to FIGS. 9(a) to 9(f), the A/D converter 13 operates as follows: The sampling frequency of the A/D converter 13 is 4fH. An analog audio signal, which is represented at FIG. 9(a), is sampled and held according to sampling pulses, which are as shown in FIG. 9(b). The sample-held signal is sampled according to sampling pulses shown in FIGS. 9(c) and 9(d) to obtain thereby two sequences of data $\{An\}$ and $\{Bn\}$. These two data sequences are supplied, respectively, to signal processing circuits 14 and 15 at a timing as shown in FIG. 9(e). In other words, the incoming analog audio signal is converted into dot-interleaving two sequences of digital data.

The signal processing circuits 14 and 15 add error correction codes to these data signals. The signals first have their data arrays changed. They are then time-base contracted and are further subjected to a digital modulation process, etc. After completion of these signal processing operations, these signals are supplied to gate circuits 18 and 19 via adders 16 and 17. At the gate circuits 18 and 19, these signals are simultaneously gated as will be further described later. Then, they are supplied via switches 20, 21, 22 and 23 to heads Ha, Hb, Hc and Hd to be recorded on a magnetic recording tape 1. Further, at this time, a rotation phase detection signal (hereinafter referred to as a PG signal), which is indicative of the rotation phase of a rotary cylinder 2, is detected by a detector 24. With the PG signal detected, a cylinder motor control circuit 25 causes a cylinder motor to rotate the cylinder 2 at a constant speed. The magnetic tape 1 is caused to travel at a constant speed in the direction of either arrow 7 or arrow 9.

In the case of a reproducing operation, the heads Ha, Hb, Hc and Hd reproduce two sequences of time-base compressed digital audio signals. These signals are supplied via switches 20, 21, 22 and 23 to the gate circuits 18 and 19. The gate circuits 18 and 19 then simultaneously gate these two sequences of digital signals to bring them back to the signal processing circuits 14 and 15. The signal processing circuits 14 and 15 then perform their signal processing operations on these signals in a converse manner including demodulation, error correction, time-base expansion, etc. to obtain demodulated digital audio data signals. These digital data signals are then supplied, in parallel with each other, to the digital-to-analog (D/A) converter 26. Then, the analog signal, which is shown in FIG. 9(a), is reproduced in the form of a data sequence $\{An\}$ obtained by sampling at a timing indicated by A1, A2, A3, A4,—and in the form of another data sequence $\{Bn\}$ obtained by sampling at a timing indicated by B1, B2, B3, B4,—. These data sequences $\{An\}$ and $\{Bn\}$ are simultaneously produced. These data are read out one after another at intervals of $\frac{1}{4}$fH. The D/A converter then takes out these data one by one in the order of An, Bn, An+1, Bn+1,—. More specifically, levels corresponding to the data included in the data sequence $\{An\}$ are produced when a signal shown in FIG. 9(f) is at a high level, and levels corresponding to the data included in the other data sequence $\{Bn\}$ are produced from the D/A converter 26 when the signal of FIG. 9(f) is at a low level. The output of the D/A converter 26 is produced via an LPF 27 at a terminal 28.

The simultaneous use of two areas in the manner as described above permits recording and reproduction of an audio signal of a maximum frequency value of 2fH, which is approximately equal to 31.5 KHz. In cases where an audio signal of a maximum frequency fH is to be recorded and reproduce by using one area in the same manner as in the conventional apparatus, either the data sequence $\{An\}$ or $\{Bn\}$ is recorded at the time of recording and then a reproducing operation can be accomplished by processing the recorded signal through the D/A converter 26 in the same manner as in the conventional reproducing operation. In that instance, however, it is preferable to prevent a folding noise from being produced by performing a sampling operation with the cut-off frequency of the LPF arranged to be 2fH.

The control over the whole system of the apparatus is performed in the following manner: The recording or reproducing areas are individually selected from the areas CH1 to CH6 with the operation part 30 manually operated by the operator. In carrying out recording, the operator is required to designate the use of a single area (hereinafter will be called a single mode) or the simultaneous use of two areas (hereinafter will be called a double mode) by operating the operation part 30.

First, let us assume that a recording operation is to be performed in the single mode by designating one of the areas CH1 to CH3. Data is then supplied from the operation part 30 to the system controller 31. The system controller 31 produces a signal S1 the level of which is low when the apparatus is in the single mode and high in the event of the double mode. An area designating circuit 32 designates areas and drives a timing pulse generating circuit 33 and a display part 34. The area designating circuit 32 is arranged to produce a signal S2 the level of which is high when the areas CH1, CH2 and CH3 are designated and another signal S3 the level of which becomes high when the areas CH4, CH5 and CH6 are designated. In this instance, the signal S2 is at a high level and the signal S3 at a low level. Therefore, the level of a signal S4 produced from an OR gate 35 is high and that of a signal S5 produced from another OR gate 36 is low. As a result, only the switches 20 and 21 are on. Further, with the signal S4 at a high level, switches 37 and 38 are connected to their terminals H shown in the drawing. Therefore, a rotation detector 41, which is arranged to detect the rotation of the flywheel 42 of a capstan 39, supplies a capstan speed detection signal (hereinafter referred to as an FG signal) to a capstan motor control circuit 43. The control circuit 43 is arranged to cause the capstan 39 to be rotated at a constant speed. With the FG signal thus supplied to the control circuit 43, therefore, the capstan 39, in conjunction with a pinch roller 40, causes the magnetic tape 1 to travel at a constant speed in the direction of arrow 7.

Figure 8:
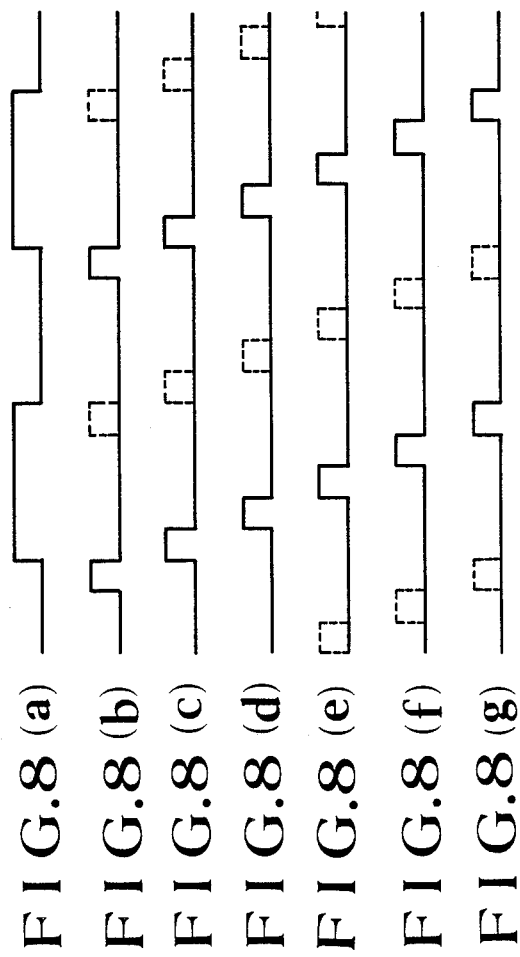
FIGS. 8(a) to 8(g) show, in a time chart, the operation of a timing signal generating circuit which is included in the tape recorder shown in FIG. 7.

Meanwhile, with any of the areas CH1, CH2 and CH3 designated, the timing pulse generating circuit 33 produces gate timing pulses as shown in FIGS. 8(b), 8(c) and 8(d). In FIG. 8, pulses depicted with full lines are arranged to define the timing at which the recording signal is to be supplied to the head Ha. The signal processing circuits 14 and 15 then receive signal processing timing pulses (shown in FIGS. 5(a) to 5(j)) which are determined according to the above-stated gate timing pulses. These signal processing circuits 14 and 15 thus perform, at a timing determined on the basis of these pulses, the signal processing operations as mentioned in the foregoing.

At this time, the cylinder motor control circuit 25 is causing the cylinder motor to rotate at a constant speed according to the PG signal. A pilot signal generating circuit 45 then produces four different tracking pilot signals one after another, on the basis of this PG signal, in a cyclic rotation. The tracking pilot signals are added, by means of an adder 16, to the digital audio signal corresponding to the data sequence {An} which has been signal processed in a manner as described in the foregoing. The output of the adder 16 is gated by the gate circuit 18 at the timing mentioned above and is supplied via switch circuits 20 and 21 to the heads Ha and Hb to be recorded onto the designated area CH1, CH2 or CH3.

In case that one of the areas CH4, CH5 and CH6 is designated and recording in the single mode is selected, the embodiment operates as follows: In that case, the level of the signal S2 becomes low and that of the signal S3 high. The output levels of the OR gates 35 and 36, that is, the levels of the signals S4 and S5 become low and high respectively. The switches 22 and 23 turn on. Since the signal S4 is at a low level, the switches 37 and 38 are connected to their terminals L. The capstan motor control circuit 43 receives the FG signal which represents the rotation of the fly-wheel 52 of the capstan 49. This brings the capstan 49 under the control of the control circuit 43. The capstan 49 causes, in conjunction with the pinch roller 50, the magnetic tape 1 to travel at a constant speed in the direction of arrow 9.

In this instance, the timing pulses, which are produced from the timing pulse generating circuit 33, are identical with the pulses produced for the area CH1 when the area CH4 is designated; identical with the pulses produced for the area CH2 when the area CH5 is designated; and identical with the pulses produced for the area CH3 if the area CH6 is designated. This is because the timing at which the heads Ha and Hb trace the areas CH1, CH2 and CH3 perfectly coincides with the timing at which the heads Hc and Hd trace the areas CH4, CH5 and CH6.

The tracking pilot signals, which are produced from the pilot signal generating circuit 45, are added by an adder 17, via another adder 48, to the digital signal based on the data sequence {Bn}. The output of the adder 17 is supplied to a gate circuit 19. The gate circuit 19 is under the control of the timing pulses shown in FIGS. 8(b), 8(c) and 8(d). The signal gated by the gate circuit 19 is supplied to the heads Hc and Hd to be recorded in one of the areas CH4, CH5 and CH6.

Next, in the event of recording in the double mode, the embodiment operates as follows: With the double mode selected at the operation part 30, the level of the signal S1 produced from the system controller 31 becomes high. The levels of the signals S4 and S5 both become high. All the switches 20, 21, 22 and 23 turn on. Since the signal S4 is at a high level, the tape 1 is caused by the capstan 39 to travel at a constant speed in the direction of arrow 7 as mentioned in the foregoing. Further, with the switch 47 turning on, a discrimination signal generating circuit 46 supplies a discrimination signal to the adder 48. The discrimination signal, in this case, is arranged to be of a low frequency which does not have any adverse effect on the tracking pilot signals and is not affected by azimuth recording. With the embodiment arranged in this manner, a digital audio signal corresponding to the data sequence {An} and the tracking pilot signals are added together; and the result of this addition is gradually recorded in one of the areas CH1, CH2 and CH3. Meanwhile, a digital audio signal corresponding to the other data sequence {Bn}, the tracking pilot signals and the discriminating signals are added together, and the result of this addition is gradually recorded onto one of the areas CH4, CH5 and CH6 which corresponds to the above-stated one of the areas CH1, CH2 and CH3. In this instance, with regard to the areas CH4, CH5 and CH6, the inclination of the helical recording tracks formed in the single mode of course somewhat differs from that of the tracks formed in the double mode.

Figure 10:
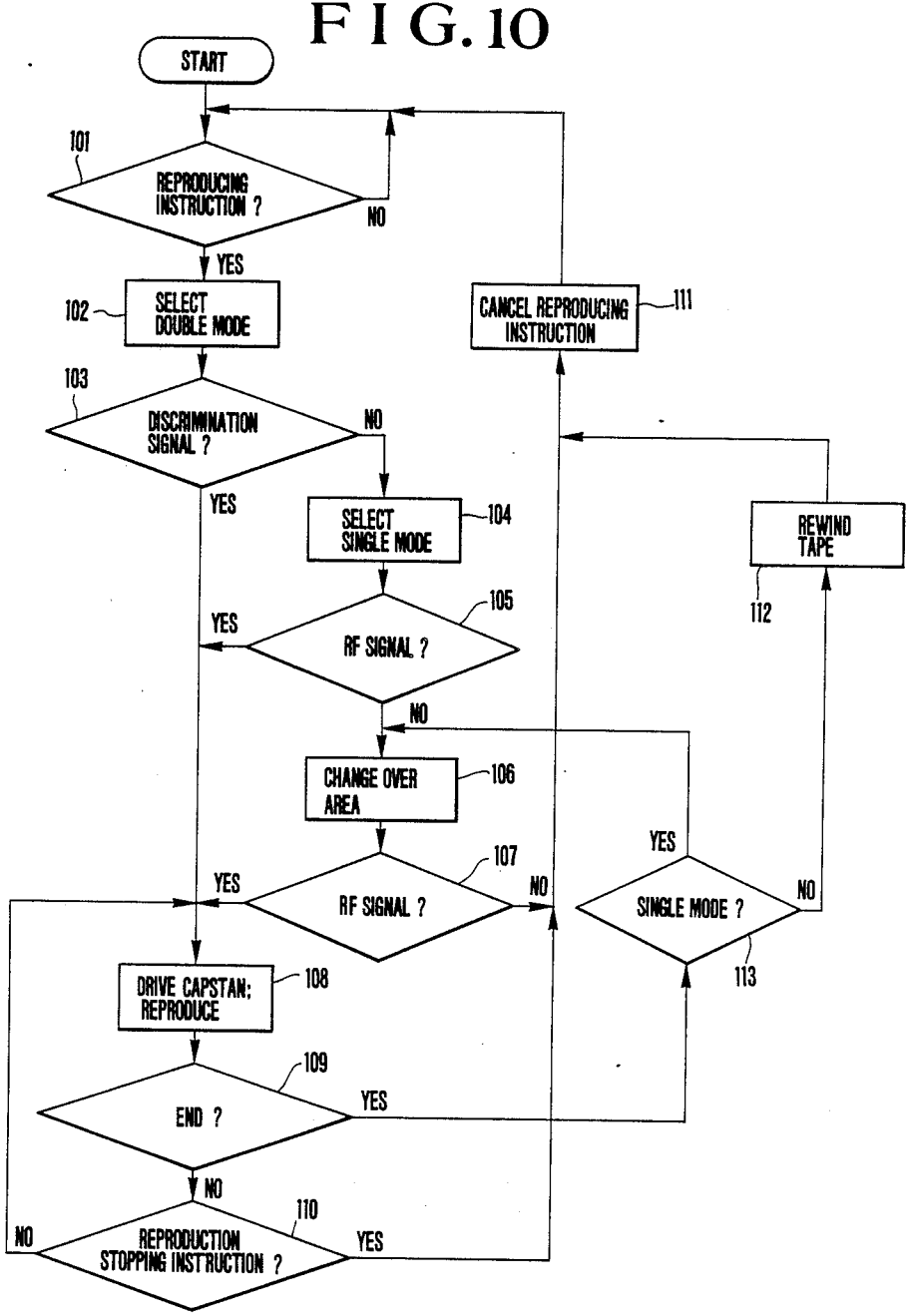
FIG. 10 is a flowchart showing the operation of a system controller included in the tape recorder shown in FIG. 7.

FIG. 10 is a flowchart showing the operation of the system controller 31 performed at the time of reproduction. The reproducing operation is as follows:

In this case, the operator operates the operation part 30 to singly designate one area from which the reproduction is to be made. The operator further gives an instruction to start the reproducing operation. With the reproducing instruction thus produced from the operation part 30 at a step 101, the system controller 31 selects the double mode at a step 102. Then, the level of the signal S1 becomes high. Following that, all the switches 20, 21, 22 and 23 turn on. As regards the gate timing pulses, they are supplied to the gate circuits 18 and 19 in a manner as shown in FIG. 8(b) when the area CH1 or CH4 is designated; in a manner as shown in FIG. 8(c) when the area CH2 or CH5 is designated; or in a manner as shown in FIG. 8(d) when the area CH3 or CH6 is designated. In response to the gate timing pulses, timing pulses, which are as shown in FIGS. 5(a) to 5(j) and are arranged to control reproducing timing, are supplied to the signal processing circuits 14 and 15.

Assuming that it is the area CH1 that is designated, a portion of the reproduction outputs of the heads Ha and Hb which is obtained from the area CH1 is gated by the gate circuit 18. Further, a portion of the reproduction outputs of the heads Hc and Hd which is obtained from the area CH4 is gated by the gate circuit 19. At that time, if the discrimination signal is included in the output of the gate circuit 19, it indicates that the recording has been made in the double mode using the areas CH1 and CH4. If not, it indicates either that the recording has been made in the single mode using the areas CH1 and CH4 or that these areas have not been used for recording.

At a step 103, a discrimination signal detection circuit 55 operates to find whether the discrimination signal is included in the output of the gate circuit 19. If the discrimination signal is detected, the circuit 55 produces a high level output. If the output of the discrimination signal detection circuit 55 is at a high level at that time, therefore, the system controller 31 instructs a driving action on the capstan 39 to begin. Then, at a step 108, reproduction is performed in the double mode. During this double mode reproduction, the switch circuit 56 is in connection with the terminal H thereof. Then, a tracking error signal is obtained in a known manner by an ATF circuit 57 using a tracking pilot signal which is picked up from the area CH1. The tracking error signal thus obtained is sampled and held and is then supplied to the capstan motor control circuit 43 via an LPF circuit which is arranged within the ATF circuit 57. Upon receipt of this tracking error signal, the capstan motor control circuit 43 controls the rotation phase of the capstan 39 in such a way as to bring the heads Ha and Hb into an on-track state for each of the recording tracks included in the area CH1. When the heads Ha and Hb are thus brought into the on-track state for each of the tracks of the area CH1, other heads Hc and Hd of course come into an on-track state for each of the tracks of the area CH4.

At the step 103, if the output of the discrimination signal detection circuit 55 is at a low level, the system controller 31 automatically selects the single mode at a step 104. In this instance, the level of the signal S1 changes to a low level. Then, if the area CH1 is designated, the level of the signal S4 becomes high and that of the signal S5 low. Then, at a step 105, it is checked to find if the digital audio signal (RF signal) is recorded in the area CH1. If the RF signal is reproduced from the area CH1, the output level of an RF signal detection circuit 58 becomes high. The high level output of the circuit 58 is supplied to the system controller 31. As a result of that, the capstan 39 begins to be driven and, at a step 108, reproduction is performed from the area CH1.

In case that the RF signal is not reproduced from the area CH1, the output level of the RF signal detection circuit 58 becomes low. The system controller 31 then automatically designates the area CH4 at a step 106. In other words, in cases where no reproduced signal is obtained from the designated area in the double mode, the designated area is automatically shifted to the other counterpart area.

With the designated area thus shifted from the area CH1 to the area CH4, the level of the signal S4 changes to a low level and that of the signal S5 to a high level. The switches 37 and 38 are both connected to their terminals L. The switches 20 and 21 are turned off and, this time, the switches 22 and 23 are turned on. A signal picked up from the area CH4 by the heads Hc and Hd is supplied to the gate circuit 19. The signal is then gated according to the same gate timing pulses as in the case of reproduction from the area CH1.

At a step 107, it is checked to see if the RF signal, i.e. the digital audio signal, is recorded in the area CH4. Then, if a reproduced RF signal is obtained from the area CH4, the level of the output of the RF signal detection circuit 59 becomes high. The high level output is supplied to the system controller 31. Following this, the capstan 49 begins to be driven. The tape 1 is caused to travel in the direction of arrow 9 and reproduction is performed from the area CH4 at a step 108.

Meanwhile, if the RF signal is not reproduced also from the area CH4, the output level of the RF signal detection circuit 59 becomes low indicating that both the areas CH1 and CH4 have not been used for recording. In that event, the system controller 31 automatically cancels the reproducing instruction at a step 111.

In this specific embodiment, as described in the foregoing, reproduction is carried out in the double mode in cases where a reproduced RF signal which corresponds to the data sequence {Bn} is obtained from one of the two corresponding areas, that is, when the discrimination signal is detected. In case that the discrimination signal is not detected and a reproduced RF signal is obtained from the designated area, a reproducing operation is performed on the designated area in the single mode instead of the double mode. Further, in the event that, while no reproduced RF signal is obtained from a designated area, a reproduced RF signal is obtained from another area which is corresponding to the designated area in the double mode, the reproducing operation is automatically performed on the latter area instead of the former. If any reproduced RF signal is obtained from neither of the two corresponding areas, no reproduction is performed and the embodiment is brought into a reposed mode.

The embodiment includes an end detection circuit 60, which operates in the following manner: There have been proposed many end detection circuits of varied kinds. Generally, however, these end detecting circuits are arranged to detect the end of a tape by detecting tape tension, a conductive part provided at the end of the tape or a transparent part provided at the end of the tape. When the tape end is detected by any of these varied methods during a reproducing operation at a step 109, it is checked to see if the reproduction is in the single mode at a step 113. If it is in the single mode, the reproducing operation is shifted at a step 106 from one area to another area which corresponds thereto in the double mode. In this instance, the rotary heads are assumed to be tracing the surface of the magnetic tape 1. Further, if the operation is found in the double mode, the tape 1 is rewound to the end thereof at the step 112, and the reproducing instruction is cancelled at the step 111 to bring the apparatus into the reposed state.

The tape recorder which is arranged according to this invention as an embodiment thereof as described in the foregoing has the following features and advantages:

The two pairs of rotary heads arranged to have different rotation phases differing 180 degrees from each other are capable of performing recording and reproduction at exactly the same timing in and from two areas. Therefore, in cases where signals of two different sequences are to be simultaneously recorded, the invented arrangement obviates the necessity of processing them in a time sharing manner. Therefore, the signals of two sequences can be simultaneously recorded in the same manner as the conventional ordinary signal processing operation.

Further, reproduction individually from an "n" number of areas can be carried out by forming an n/2 number of timing signals. The arrangement of a timing pulse generating circuit, therefore, can be simplified to a great extent.

A reproduction mode most suited to the condition of the recorded signal can be automatically obtained so that the operability of the apparatus can be improved to a great degree. Further, even in the case of a magnetic tape recorded by a tape recorder arranged to perform recording and reproduction in and from only a single area in the conventional manner, the record can be promptly played back in the optimum mode from the tape. Conversely, a magnetic tape which is recorded by the tape recorder of this invention can be used for reproduction by the conventional tape recorder. For example, in reproducing with the conventional tape recorder, an audio signal, which is recorded simultaneously in two areas on a magnetic tape by the tape recorder of this invention, a reproduced audio signal of the optimum information frequency fH can be obtained by designating either of the two areas.

In the specific embodiment described, the rotation phases of the heads Hc and Hd are arranged to be 108 degrees (=36 degrees×3) in advance of those of the heads Ha and Hb. However, they may be arranged, for example, 36 degrees in advance instead of 108 degrees. In the event of the double mode of such modification, the areas CH1, CH3 and CH5 are used for recording the signal corresponding to the above-stated data sequence {An} while the areas CH2, CH4 and CH6 are used for recording the signal corresponding to the other data sequence {Bn}.

In detecting whether or not a signal has been recorded in the single mode in the area which is to be used for recording a signal corresponding to the data sequence {Bn} in the double mode, the embodiment described is arranged to have a discrimination signal recorded in a superimposing manner beforehand and to perform this detection by detecting the discrimination signal. However, in accordance with this invention, this detection method may be replaced by some other suitable method. For example, in recording a signal in the single mode in the above-stated area, the signal may be recorded in the reverse direction on the tape (or in the direction of arrow 9 as shown in FIG. 7). Then, the above-stated detection can be easily accomplished by just detecting the recording rotation of the different frequency values of the tracking pilot signals reproduced without having the discrimination signal recorded in a superimposed manner. In that event, pilot signals of different frequency values are generated in the ordinary order of rotation; these pilot signals are supplied to the ATF circuit 57 to obtain a tracking error signal; and then a 15 Hz component of the tracking error signal is detected. In another method, the tracking pilot signals are not recorded in the area in which the signal corresponding to the data sequence {Bn} is recorded; and, at the time of reproduction, the presence or absence of the pilot signals is detected. This method is advantageous in cases where it is meaningless to singly reproduce the signal corresponding to the data sequence {Bn}. This advantage results from the feature of this embodiment that, with tracking control performed for one of the two areas, tracking for the other area can be also accurately accomplished.

While the simultaneous use of two areas according to the arrangement of the embodiment of this invention permits recording and reproduction of an information signal having a bandwidth twice as large as the bandwidth which is possible with a single area used, this invention is of course advantageously applicable also to other modes of recording and reproduction simultaneously using two areas, such as sound-on-sound recording, high fidelity recording and reproduction or four-channel recording and reproduction.

What is claimed is:

1. An information signal recording apparatus, comprising:
    (a) input means for inputting an information signal;
    (b) data sequence forming means for forming first and second data sequences in parallel with each other by performing two different sampling operations on information signal inputted by said input means at different phases and at a same frequency;
    (c) first recording means for recording a first recording signal relative to said first data sequence in a first area of a tape-shaped bearing medium extending in a longitudinal direction of said medium; and
    (d) second recording means for recording a second recording signal relative to said second data sequence in a second area of said medium extending in parallel with said first area on said medium.

2. An apparatus according to claim 1, wherein said first recording signal includes a digital signal which is obtained by time-base compressing said first data sequence; and said second recording signal includes a digital signal which is obtained by time-base compressing said second data sequence.

3. An apparatus according to claim 2, wherein said common information signal includes audio information.

4. An apparatus according to claim 1, wherein each of said first and second recording means includes at least one rotary head which is arranged to transversely trace said medium.

5. An information signal recording apparatus, comprising:
    (a) input means for inputting an information signal;
    (b) first head means including at least one rotary head;
    (c) second head means including at least one rotary head;
    (d) sampling means for sampling said information signal inputted by said input means and being able to supply recording signals to said first and second head means; and
    (e) mode control means for changing the apparatus between first and second modes wherein, in said first mode, said sampling means samples the information signal inputted by said input means at a predetermined frequency and said sampling means supplies a recording signal to said first head means and does not supply a recording signal to said second head means, and, in said second mode, said sampling means samples said information signal inputted by said input means at a frequency higher than the predetermined frequency and supplies recording signals to said first and second head means.

6. An apparatus according to claim 5, wherein said first head means includes a pair of heads having a rotation phase difference of 108 degrees from each other, and said second head means includes a pair of heads having a rotation phase difference of 108 degrees from each other.

7. An information signal recording and/or reproducing apparatus arranged to record or reproduce information signals on or from a tape-shaped record bearing medium having an m number of areas extending in parallel with each other in an longitudinal direction of said medium, widths of said areas being the same, where m is an integer greater than 1, comprising:
    (a) a first rotary head;
    (b) a second rotary head which rotates at a phase differing from said first rotary head by an angle of 180°, said first and said second rotary heads being operable for alternately recording or reproducing a first information signal on and/or from a first area among the m number of areas by tracing said medium, each of the first and second rotary heads tranversing each of the m number of areas while rotating an angle of $\theta°$;
    (c) a third rotary head which rotates at a phase differing from said first rotary head by an angle of $(n \times \theta)$ degrees, wherein n is an integer and $(n \times \theta)$ is less than 180; and (d) a fourth rotary head which rotates at a phase differing from said second rotary head by an angle of ($n \times \theta$) degrees, said third and fourth rotary heads being operable for alternately recording or reproducing a second information signal on and/or from a second area among the m number of areas.

8. An apparatus according to claim 7, wherein said third and fourth rotary heads are arranged to record or reproduce the second information signal on or from the second area while said first and second rotary heads are recording or reproducing the first information signal on or from the first area.

9. An apparatus according to claim 8, further comprising:
first gate means connected to said first and second rotary heads;
second gate means connected to said third and fourth rotary heads; and
control means for operating said first gate means and said second gate means at the same timing.

10. An apparatus according to claim 9, further comprising:
designating means for designating one of said m number of areas for recording or reproduction of said first information signal by said first and second rotary heads, and means for detecting a rotation phase of said first rotary head.

11. An apparatus according to claim 10, wherein said control means is arranged to operate by using an output of said designating means and an output of said phase detecting means.

12. An apparatus according to claim 7, and further comprising input means for inputting an information signal; and producing means for producing said first and second information signals in parallel with each other from a common information signal inputted by said input means.

13. An apparatus according to claim 12, wherein said producing means includes sampling means for sampling said common information signal inputted by said input means at two different phases and at the same frequency to produce two sampling outputs in parallel with each other.

14. An apparatus according to claim 13, wherein said common information signal inputted by said input means includes audio information, and said producing means further includes means for time-base compressing the two output of said sampling means.

15. An apparatus according to claim 7, further comprising a rotary cylinder on which said first, second, third and fourth rotary heads are mounted.

16. An information signal recording apparatus comprising:
(a) input means for inputting an information signal;
(b) data sequence forming means for forming first and second data sequences in parallel with each other by performing two different sampling operations on a common information signal inputted by said input means at different phases and at a same frequency;
(c) first recording means for recording a first recording signal relative to said first data sequence in a first area of a tape-shaped bearing medium extending in a longitudinal direction of said medium;
(d) second recording means for recording a second recording signal relative to said second data sequence in a second area of said medium extending in parallel with said first area on said medium;
(e) mode control means for setting a mode of the apparatus from among a plurality of modes which include a first recording mode in which said first signal is recorded and said second signal is not recorded and a second recording mode in which said first and second signals are recorded; and
(f) third recording means for recording a mode information which indicates the mode of the apparatus set by said mode control means.

17. An apparatus according to claim 16, wherein said third recording means includes mixing means for mixing said mode information with at least one of said first and second signals.

18. An apparatus according to claim 16, further comprising:
first reproducing means for reproducing said first signal;
second reproducing means for reproducing said second signal; and
third reproducing means for reproducing said mode information.

19. An apparatus according to claim 18, further comprising reproducing operation control means for controlling the reproducing operation of said second reproducing means on the basis of said mode information reproduced by said third reproducing means.

20. An information signal recording apparatus comprising:
(a) input means for inputting an information signal;
(b) first recording means for recording a first recording signal relative to said information signal in a first area of a tape-shaped bearing medium extending in a longitudinal direction of said medium;
(c) second recording means for recording a second recording signal relative to said information signal in a second area of said medium extending in parallel with said first area on said medium;
(d) sampling means for sampling said information signal inputted by said input means and being able to supply said first and second recording signals to said first and second recording means;
(e) mode control means for changing the apparatus between first and second modes wherein, in said first mode, said sampling means samples the information signal outputted by said input means at a predetermined frequency and said sampling means supplies said first recording signal to said first recording means and does not supply said second recording signal to said second recording means, and, in said second mode, said sampling means samples said information signal inputted by said input means at a frequency higher than the predetermined frequency and supplies said first and second recording signals to said first and second recording means; and
(F) third recording means for recording a mode information which indicates the mode of the apparatus set by said mode control means.

21. An apparatus according to claim 20, wherein said third recording means includes mixing means for mixing said mode information with at least one of said first and second signals.

22. An apparatus according to claim 20, further comprising:
first reproducing means for reproducing said first signal;
second reproducing means for reproducing said second signal; and third reproducing means for reproducing said mode information.

23. An apparatus according to claim 22, further comprising reproducing operation control means for controlling the reproducing operation of said second reproducing means on the basis of said mode information reproduced by said third reproducing means.

* * * * *